United States Patent [19]
Chremos et al.

[11] 3,843,694
[45] Oct. 22, 1974

[54] CATALYTIC EPOXIDATION OF OLEFINS
[75] Inventors: George N. Chremos; Bruno J. Barone, both of Houston, Tex.
[73] Assignee: Petro-Tex Chemical Corporation, Houston, Tex.
[22] Filed: Aug. 19, 1971
[21] Appl. No.: 173,307

[52] U.S. Cl. .......................................... 260/348.5 L
[51] Int. Cl. ............................................. C07d 1/08
[58] Field of Search .............................. 260/348.5 L

[56] References Cited
FOREIGN PATENTS OR APPLICATIONS
1,088,810    10/1967    Great Britain
1,026,971    4/1966    Great Britain OTHER PUBLICATIONS
CA, Vol. 72, (1970), 11804c.
Chemical Abstract, Vol. 72, 1970, 21397m.

*Primary Examiner*—Norma S. Milestone
*Attorney, Agent, or Firm*—N. Elton Dry

[57]    ABSTRACT

Boron phosphate has been found to provide high selectivity to epoxides in the oxidation of olefinic compounds with organic hydroperoxides when the $BPO_4$ is employed in a catalytic amount. Selectivities for the epoxide as high as 80.0 percent have been achieved at conversion of 92.2 percent (based on hydroperoxide).

2 Claims, No Drawings

CATALYTIC EPOXIDATION OF OLEFINS

The present invention relates to the preparation of olefin oxides and in particular relates to a new catalyst for use in the epoxidation of ethylenically unsaturated organic compounds using organic hydroperoxides.

Background of the Invention

Until recently large scale preparation of epoxides was achieved by the cumbersome chlorohydrin route which required reacting an olefin with hypochlorous acid to form the olefin chlorohydrin followed by the dehydrochlorination of the olefin chlorohydrin to form the epoxide.

Another method which has not been extensively employed for large scale preparation of epoxides is the peracid route. In this method an organic peracid is formed by the reaction of hydrogen peroxide with the organic aldehyde and the epoxidation of an olefin with the peracid. Unfortunately peracids are dangerous to handle as well as being expensive, corrosive and generally non-recoverable.

Other workers have attempted to employ hydrogen peroxide with various metal compounds such as $MnO_2$, $WO$ and $MoO$, however, this system is selective for hydroxylation.

Many of the problems present in the prior process were overcome by a process disclosed in U.S. Pat. No. 3,351,635. In that process a soluble compound of molybdenum, tungsten, titanium, columbium, tantalum, rhenium, selenium, chromium, zirconium, tellurium or uranium was used to catalyze the epoxidation of an ethylenically unsaturated organic compound with an organic hydroperoxide. Organic hydroperoxides can be extremely hazardous under certain conditions, particularly in concentrated form. Thus the hydroperoxides are usually employed in a diluted form. One disadvantage of the liquid phase process disclosed in U.S. Pat. No. 3,351,635 is the homogenous nature thereof. Catalyst recovery requires more effort than a heterogeneous system.

It is an object of this invention to provide a new and superior catalyst for the epoxidation of ethylenically unsaturated organic compounds in liquid phase with organic hydroperoxides. Another object is to provide a heterogeneous catalyst system for the epoxidation of ethylenically unsaturated organic compounds. These and other objects of the present invention will become apparent from the following discussion.

DESCRIPTION OF THE INVENTION

It has been found that ethylenically unsaturated organic compounds can be oxidized to oxirane compounds by a process comprising contacting an ethylenically unsaturated organic compound with an organic hydroperoxide in liquid phase in the presence of a catalytic amount of boron phosphate.

Boron phosphate, $BPO_4$ is prepared by the reaction of boric acid and phosphoric acid and has been determined to have tetrahedral bonds. The boron phosphate is solid and insoluble in the reaction. The reaction can be carried out batchwise by stirring a catalytic amount of the $BPO_4$ in the reaction medium or the reaction medium can be passed over a supported or unsupported catalyst in a bed in a continuous process. Thus, catalyst separation is extremely simple and complete. The amount of boron phosphate is generally about 0.05 to 1.5 weight percent, preferably about 0.1 to 1.0 weight percent based on the weight of olefinic starting material. No greater amount of catalyst should be used since this is detrimental. The total amount of the catalyst can be contacted with the reaction medium initially or it can be contacted incrementally, such as by adding increments to a batch reaction. Known epoxidation catalysts such as the soluble compounds of molybdenum, tungsten, titanium, chromium, zirconium, tellurium and uranium can be present in the reaction.

The epoxidation is carried out at somewhat elevated temperatures. Generally the temperatures that are most suitable for epoxidation will be about 70° to 140° C. and more preferably about 80° to 120° C. Initially the production of epoxide may be aided by the use of higher temperatures, e.g., 130°–140° C. However, once the reaction is initiated the temperature is usually reduced. Generally temperatures higher than 130° C. are not used throughout the reaction since the possibility of further oxidation is enhanced. The epoxidation is carried out by contacting an olefinically unsaturated compound in liquid phase at the temperatures and conditions set out herein with an organic hydroperoxide having the formula ROOH wherein R is an organic radical. In practice R is a substituted or unsubstituted alkyl, cycloalkyl, aralkyl, aralkenyl, hydroxyaralkyl, cycloalkenyl, hydroxycycloalkyl and the like having about 3 to 20 carbon atoms, including R represents a heterocyclic radical.

Particularly useful hydroperoxides are derived from alkyl hydrocarbons and alkylaromatic hydrocarbons having at least one hydrogen atom on a carbon adjacent to the ring, having the general formula

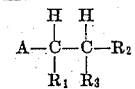

where each of $R_1$, $R_2$ and $R_3$ can be hydrogen or an alkyl radical having 1 to 20 carbon atoms and A is hydrogen or an aromatic ring. The aromatic ring, may be that of benzene, and may be substituted with chloro, bromo, fluoro, nitro, alkoxyl, aryl or carboxy (or esters thereof) groups. The ring may have one or more side chains with up to 12 carbon atoms in each side chain.

Illustrative and preferred hydroperoxides are tertiary butyl hydroperoxide, tertiary amyl hydroperoxide, α,α-dimethyl benzyl hydroperoxide, ethyl benzene hydroperoxide, α-phenylethyl hydroperoxide, cumene hydroperoxide, cyclohexanone hydroperoxide, tetralin hydroperoxide, tertiary hexyl hydroperoxide, cyclopentyl hydroperoxide, decalin-4'-hydroperoxide, methyl cyclohexene hydroperoxide, methyl ethyl ketone hydroperoxide, α-methyl-α'-n-propyl-p-xylene dihydroperoxide and the like.

Most preferably, in the present invention the hydroperoxides are prepared through oxidation of the corresponding hydrocarbon. The oxidation can be carried out using molecular oxygen as provided by air although pure oxygen as well as oxygen in admixture with inert gas in greater or lesser concentrations than air can be used. Oxidation temperatures broadly in the range 40° to 180° C., preferably 90° to 140° C. and pressure of 15 to 1,000 p.s.i.a. and preferably 30 to 150 p.s.i.a. can be used. The oxidation is continued until about 1 to 70 percent, and preferably about 10 to 50 percent of the hydrocarbon has been converted to the hydroperoxide.

Various additives of known type can be employed during the alkylaromatic oxidation to promote hydroperoxide production.

The hydrocarbon oxidation effluent comprises a solution of the hydroperoxide in hydrocarbon along with some alcohol formed during the oxidation. This effluent can be employed in the epoxidation without concentrating the hydroperoxide, or the oxidation effluent can be distilled to first concentrate the hydroperoxide.

In the oxidation the mole ratio of the ethylenically unsaturated compound to the organic hydroperoxide can vary over a wide range. Generally, the mole ratios of ethylenic unsaturations to hydroperoxide may be in the range of 0.5:1 to 100:1, desirably 1.1 to 30:1 and preferably 2:1 to 20:1.

Sufficient pressure is employed so as to maintain the reaction mixture in liquid phase. This will usually require more than atmospheric pressure. It is not necessary to use any more pressure than is necessary to maintain the liquid phase, generally pressures of atmospheric up to about 1,000 p.s.i. will be sufficient.

The reaction is performed under liquid phase conditions and, preferably, the ethylenically unsaturated compound is employed in excess and conveniently serves as the reaction solvent. If desired, however, other solvents which are inert to the reaction conditions can be employed such as the esters of aliphatic alcohols and carboxylic acids, hydrocarbons, saturated ethers and alcohols, water and mixtures thereof. In general, any organic liquid that is inert to the reactants and to the reaction conditions can be employed for the reaction solvent in the invention. Generally it is convenient to employ organic liquids having from 1 to about 25 carbons; preferably solvents having from 1 to 6 carbons are used. Illustrative solvents of the aforementioned classes include the following esters; methyl acetate, ethyl acetate, n-propylpropionate, isopropyl acetate, ethylpropionate, n-butylbutyrate, sec-butyl acetate, isobutylacetate, ethyl-n-butyrate, n-butyl acetate, isoamyl acetate, n-amyl acetate, glycol diformate, furfural acetate, isoamyl n-butyrate, ethylacetyl acetate, diethyl oxalate, glycol diacetate, isoamyl isovalerate, n-dibutyl oxalate, etc.

Various aliphatic hydroxy compounds can be employed such as methanol, ethanol, propanol, isopropanol, butanol, isobutanol, amyl alcohol, isoamyl alcohol, hexanol, isohexanol, heptanol, isoheptanol, 3-methylhexanol-1, lauryl alcohol, 3,4-diethylheptanol-4, 4-ethylhexanol ethylene glycol, propylene glycol, etc.

Various ethers can also be employed including the ethers of the aforementioned aliphatic alcohols such as methyl ethyl ether, diethyl ether, dioxane, diisopropyl ether, diisoamyl ether, diethylene glycol diethyl ether, tetraethylene glycol dimethyl ether, ethyl heptyl ether, isobutyl amyl ether, lauryl ethyl ether, etc.

Hydrocarbons including the saturated and aromatic hydrocarbons can of course be employed as suitable inert solvents, e.g., pentane, hexane, heptane, octane, isooctane, decane, dodecane, kerosene, naphtha, benzene, xylene, toluene, cumene, isocumene, naphthalene, etc.

In addition other inert diluents such as the nitro or halo substituted hydrocarbons are suitable, e.g., nitrobenzene, trichlorobenzene, carbon tetrachloride and the like.

The ethylenically unsaturated compounds which may be epoxidized by the process of the invention include substituted and unsubstituted aliphatic and alicyclic olefins which may be, for example, hydrocarbons, esters, alcohols, ketones or ethers.

A wide variety of ethylenically unsaturated compounds can be epoxidized in accordance with the process. In general, any organic olefin, preferably a hydrocarbon having from 2 to about 30 carbon atoms (preferably 3 or more carbon atoms) can be oxidized, more preferably olefinically unsaturated compounds having from 3 to 12 carbon atoms are oxidized. The aliphatic hydrocarbon monoolefins include: ethylene, propylene, butene-1, butene-2, isobutene, pentene-1, pentene-2, hexene, isohexene, heptene, 3-methylhexene-1, octene-1, isooctene, nonene, decene, dodecene, tridecene, pentadecene, octadecene, eicosene, docosene, tricosene, tetracosene, pentacosene, styrene, methyl styrene, vinyl toluene, etc. Examples of hydrocarbon diolefins with can also be oxidized include: pentadiene, hexadiene, octadiene, decadiene, tridecadiene, eicosadiene, tetracosadiene, etc. The alicyclic olefins are illustrated by cyclopentene, cyclohexene, cycloheptene, methycyclohexene, isopropylcyclohexene, butylcyclohexene, octylcyclohexene, dodecylcyclohexene, vinyl cyclohexene, phenyl cyclohexene, etc.

Olefins having halogen, oxygen, sulfur and other similar substituent may be used. Such substituted olefins are, such as, methyl-methacrylate, methyl oleate, methyl vinyl ketone and allyl chloride. In general all olefinic material within the ranges specified, which have been epoxidized by the methods of the prior art, including unsaturated polymers, can be epoxidized by the process of the invention.

In the present invention an advantage arises from the fact that during the epoxidation reaction the organic hydroperoxide, ROOH, is converted almost quantitatively to the corresponding alcohol ROH. The alcohols as such are quite valuable or may be reconverted to hydroperoxides. This is achieved by dehydration of the alcohol to produce the olefin and hydrogenation of the olefin to the saturated hydrocarbon, which can be oxidized to the hydroperoxide. In a particular embodiment of the present invention the organic hydroperoxide can serve as a source of olefinic feed for the reaction. For example, if isobutene is being epoxidized using tertiary butyl hydroperoxide, tertiary butanol is produced in high yields and can be dehydrated to the isobutene. Similar application can be made with other pairs of reactants, though in some instances it may be necessary to isomerize the olefin derived from by-product alcohols to the proper isomer.

The epoxides produced by this invention have a great deal of utility in the preparation of epoxy resins or in other resins where coupling or cross-linking is desirable. In a particular case the epoxide produced is the precursor of a valuable diolefin, e.g., 2-methyl butene-2 is oxidized to 2,3-epoxy-2-methylbutane by the improved process of the present invention. The 2,3-epoxy-2-methylbutane is isomerized to the allylic alcohol form and dehydrated to isoprene, which is used to prepare polyisoprene, a highly desirable synthetic rubber. The 2,3-epoxy-2-methyl butane can be concurrently isomerized and dehydrated in liquid phase, with or without a diluent such as isopentane or hexane, preferably without a diluent, bypassing a stream of 2,3-epoxy-2-methylbutane through a bed of acid catalyst at temperatures of 200 to 400° C. and 15 to 1000 p.s.i.g. The acid catalysts suitably used for simultaneous isomerization and dehydration are, such as acidic metal oxides, e.g., alumina, chromia, thoria and titania; siliceous refractory oxides, e.g., silica-alumina, silica-magnesia, silica-titania and silica-magnesia-zirconia, and alkali and alkaline earth metal phosphates, e.g., lithium phosphate and magnesium phosphate.

In carrying out the process of the invention an olefinically unsaturated compound and organic hydroperoxide are contacted in the presence of a Boron phosphate catalyst. One convenient method for conducting this operation has been found to disperse the catalyst in a particulate form in the reaction medium and to maintain the mixture in an agitated state.

The following examples will illustrate the operation and the advantages to be derived therefrom. The apparatus used in each of the following examples was a 3,000 p.s.i. magnetically stirred 1.4 liter stainless steel autoclave equipped with a Dispersamax agitator, reflux condenser and internal water cooling coil. The olefinic feed, and other materials for the reaction were charged to the reactor and the reaction carried out for usually several hours. Product analysis was by gas chromatograph using internal standards. Epoxide content was determined by both gas chromatograph and the chlorohydrin chemical method as described in organic analysis, Interscience Publishers, N.Y., 1953, Vol. 1, page 134. Hydroperoxide content was determined by iodometric analysis of the original oxidate.

EXAMPLE 1

This example demonstrates the use of boron phosphate according to the present invention. The apparatus and analytical techniques described above were employed. 300 grams of 2-methylbutene-2, 50 grams of tertbutyl hydroperoxide (71.33 hydroperoxide by iodometric titration) and 1.0 gram of boron phosphate were charged to the reactor and agitated for 5.0 hours at 110° C. The initial weight percent of hydroperoxide based on the total reactants was 10.19 and the final weight percent of hydroperoxide after 5 hours was 0.79 based on total reactants. The conversion of hydroperoxide was 92.2 percent. The selectivity for the epoxide, 2,3-epoxy-2-methyl butane was 80.0 mole percent giving a yield (conversion X selectivity) of 73.6 mole percent based on hydroperoxide. The other principal product was methyl isopropyl ketone, selectivity of 15.8 mole percent.

EXAMPLES 2 and 3

Example 2 shows the importance of the limitations for maximum catalyst concentration. The conditions, reactants and results are set out in TABLE I. Example 1 is included for comparison. Example 3 is submitted to compare $BPO_4$ and phosphoric acid.

TABLE I

BORON PHOSPHATE CATALYZED REACTION OF TERT-BUTYL HYDROPEROXIDE AND 2-METHYLBUTENE-2 UNDER 400 PSI NITROGEN PRESSURE

| Example No. | 1 | 2 | 3 |
|---|---|---|---|
| Reactants | | | |
| 2-Methylbutene-2, g. | 300 | 300 | 300 |
| t-Butyl Hydroperoxide, [a] g. | 50 | 50 | 50 |
| Boron Phosphate, g | 1.0 | 5.0 | — |
| Boron Phosphate, wt. % [b] | .33 | 1.6 | — |
| Phosphoric Acid, g | — | — | 1.0 |
| Reaction Conditions | | | |
| Temperature, °C. | 110 | 100 | 110 |
| Total Reaction Time, hrs. | 5.0 | 5.0 | 5.0 |
| Results | | | |
| Hydroperoxide Concentration Initial, wt. % [c] | 10.19 | 10.19 | 10.61 |
| Hydroperoxide Concentration Final, wt % [c] | 0.79 | 5.22 | 3.51 |
| Hydroperoxide Conversion % | 92.2 | 48.8 | 66.9 |
| Selectivity, % (Mole Product/100 Mole Hydroperoxide Consumed) | | | |
| 2,3-Epoxy-2-Methylbutane | 80.0 | 3.1 | 2.2 |
| Methyl Isopropyl Ketone | 15.8 | 18.7 | 56.0 |
| 2-Methyl-3-butene-2-ol | — | 59.6 | 37.5 |
| 2-Methylbutane-2,3-diol | — | 7.8 | 2.2 |

[a] Analyzed as 71.33% hydroperoxide by iodometric titration. (Ex.3;74.45%)
[b] Based on weight of 2-methylbutene-2
[c] Based on total weight of reactants

The invention claimed is:

1. A process for the preparation of 2,3-epoxy-2-methylbutane comprising contacting 2-methyl butene-2 with an organic hydroperoxide in a mole ratio of 2-methyl butene-2 compound to organic hydroperoxide of from 0.5:1 to 100:1, at a temperature of from about 70° C to about 140° C and a pressure sufficient to maintain said 2-methyl butene-2 and said organic hydroperoxide in liquid phase, said contacting occuring in the presence of a catalyst comprising from about 0.05 to 1.5 weight percent of boron phosphate based on the weight of said 2-methyl butene-2.

2. The process of claim 1 wherein the temperature is from 80° C to 120° C.

* * * * *

PO-1050
(5/69)

UNITED STATES PATENT OFFICE
CERTIFICATE OF CORRECTION

Patent No. 3,843,694            Dated   Oct. 22, 1974

Inventor(s)   George N. Chremos et al

It is certified that error appears in the above-identified patent and that said Letters Patent are hereby corrected as shown below:

Col. 3, line 17 reads "1.1" but should read --- 1 : 1 ---.

Col. 4, line 22 reads "with" but should read -- which ---.

Col. 6, line approx. 24-47 reads "(Ex. 3;74.45%)35" but should read --- (Ex. 3; 74.45%) ---.

Signed and sealed this 22nd day of April 1975.

(SEAL)
Attest:

RUTH C. MASON
Attesting Officer

C. MARSHALL DANN
Commissioner of Patents
and Trademarks